Aug. 26, 1958   J. KEYES   2,849,185
HEATING SYSTEM

Filed Dec. 8, 1953   3 Sheets-Sheet 1

Inventor:
Jack Keyes
By
Attorney.

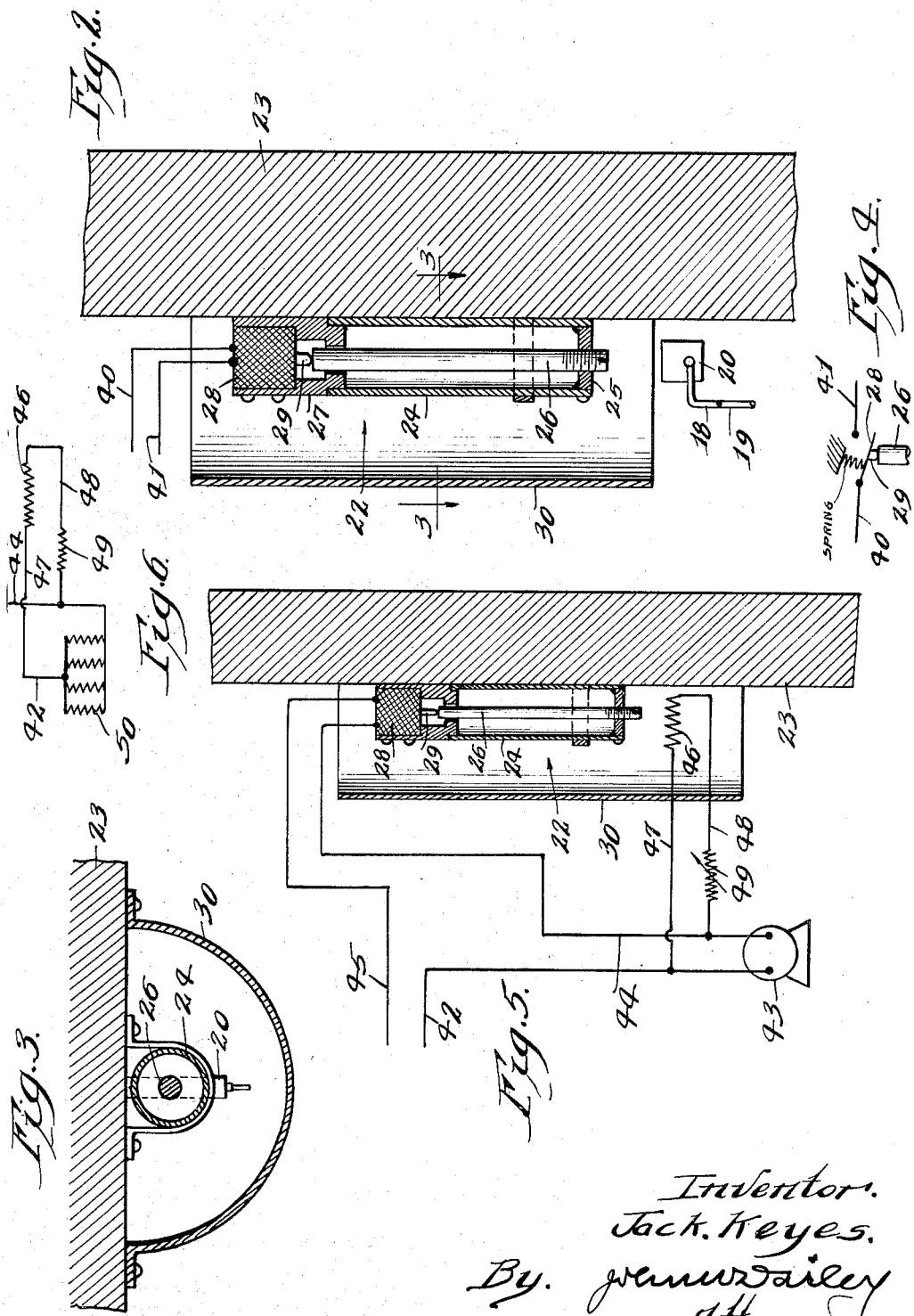

Aug. 26, 1958  J. KEYES  2,849,185
HEATING SYSTEM

Filed Dec. 8, 1953  3 Sheets-Sheet 3

Inventor.
Jack Keyes.

By John W Darley
Attorney.

United States Patent Office 2,849,185
Patented Aug. 26, 1958

2,849,185

HEATING SYSTEM

Jack Keyes, Park Ridge, Ill., assignor to Bell & Gossett Company, Morton Grove, Ill., a corporation of Illinois Application December 8, 1953, Serial No. 396,949

7 Claims. (Cl. 236—9)

My invention relates to heating systems and is concerned more particularly with a control thereof for maintaining a comfortable condition in a living space and which is responsive to the thermal factors, external and internal of the space, which affect such a condition.

By way of example and not of limitation, the invention will be described in connection with a closed, pump circulated, hot water heating system of the conventional residence type.

Generally speaking, the primary purpose of any heating system for supplying heat to a livable space is that it shall establish a feeling of comfort for the occupants of the space. The normal body temperature of a human being is 98.6° F. and since in a comfortable situation the human body must at all times lose heat, the maintenance of a feeling of warmth or comfort is essentially a problem of reducing heat loss rather than of establishing a net heat flow to the body. Dissipation of body heat occurs by evaporation, convection and radiation, but since in the usual sedentary situation, the evaporation loss remains almost constant for all comfort conditions, the problem of maintaining a comfortable environment is largely concerned with the convection-radiation relationship in the body.

In dealing with the problem of comfort, there has been developed the so-called comfort equation as a basis for the control of heating systems whether of the convection or radiant panel type. This equation states that, in degrees Fahrenheit, the ambient air temperature plus the mean radiant temperature in a living space equals 140° approximately. The mean radiant temperature is defined to be the surface temperature of a large, uniformly heated enclosure in which the net radiant loss of an occupant would equal that which occurs in the actual room under consideration. Hence, it is possible within reasonable limits to vary either the air or the mean radiant temperature or both of these temperatures and still obtain a comfortable environment so long as the summation of these temperatures equals 140° F. approximately.

A satisfactory maintenance of a comfort condition must necessarily take into account the outside weather conditions during the winter season, including the effects of temperature, rain, snow, sun and wind since there is a loss of the heat content of the living space during this period. In other words, these external weather factors tend to continually modify the thermal condition of the space by operating through an outside wall forming at least one boundary thereof and accordingly tend to reduce either the air temperature or the mean radiant temperature or both of these temperatures so that their sum is less than the numerical value expressed above. Quantitatively considered, the heat loss will vary with fluctuations in the outside weather factors and, for any given outside wall, will depend in relation to time on the nature of the construction.

The present invention is based on the concept that the maintenance of a comfortable condition in a living space depends on the thermal environment thereof which includes the space air temperature, radiation from space and body surfaces and, importantly, the effect on the space thermal situation exercised by the thermal condition of the interior surface of an outside wall as varied by changes in the outdoor temperature and other weather factors including rain, snow, sun and wind.

It is therefore one object of my invention to provide a heating system including a control which is affected by the thermal condition in the space and is also responsive to external weather changes at the time they begin to influence the thermal condition of the space being heated, thereby providing a closer and more economical regulation of the system and automatically taking into account the lag factor of the outside wall to which the control is attached.

A further object is to provide a system of the character indicated in which the control is positioned in heat exchange relation to the interior surface of an outside wall and is additionally and cumulatively responsive to the thermal condition of the space and factorially related to the heat input of the space.

These and further objects of the invention will be set forth in the following specification, reference being had to the accompanying drawings, and the novel means by which said objects are effectuated will be definitely pointed out in the claims.

In the drawings:

Fig. 2 is a sectional view of the control shown in Fig. 1.

Fig. 3 is a section along the line 3—3 in Fig. 2.

Fig. 4 is a diagrammatic view of the switch element of the control shown in Fig. 2.

Figs. 5, 6 and 7 are schematic views, Figs. 5 and 7 being partly in section, of modified forms of the system.

Figure 1:
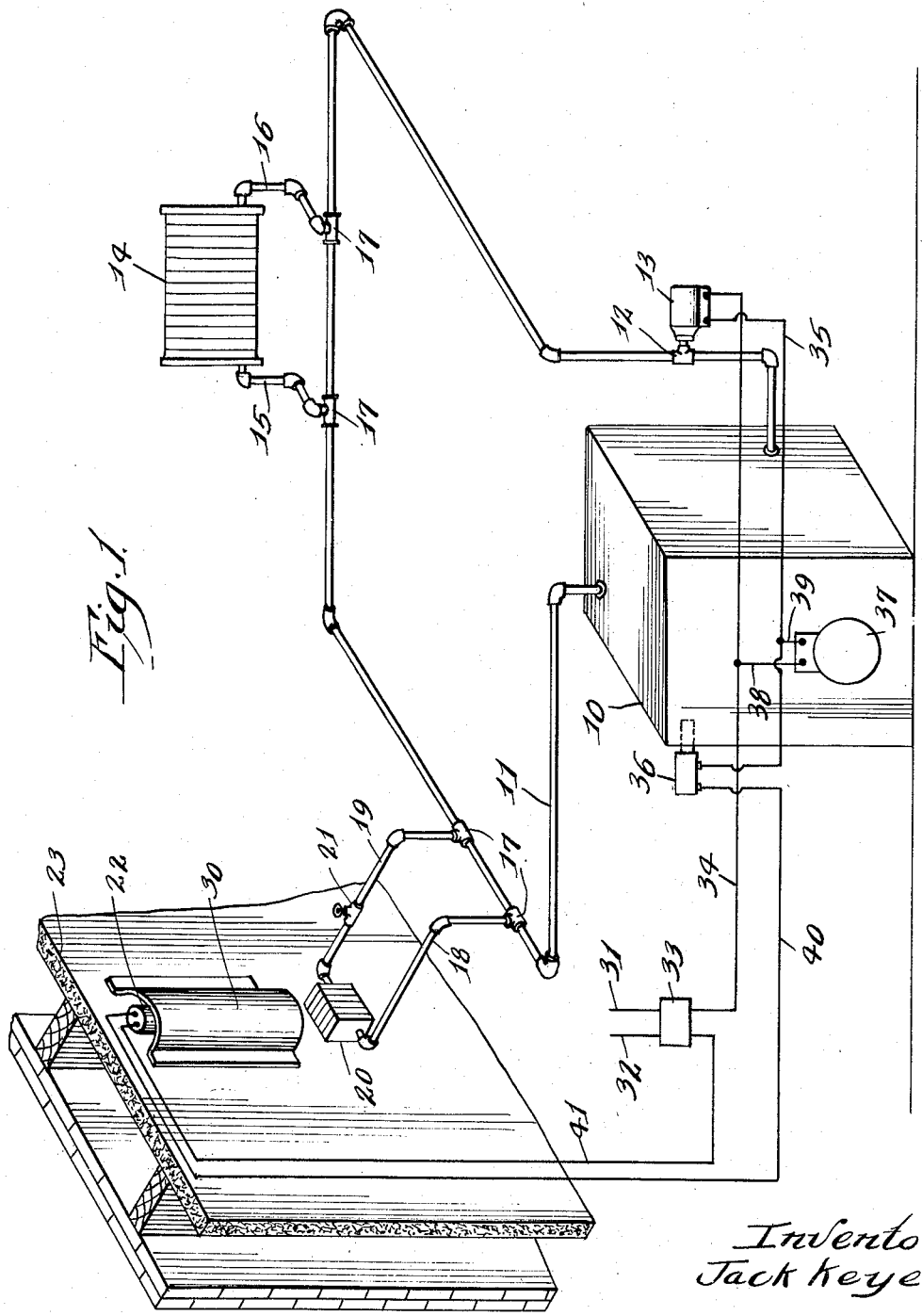
Fig. 1 is a perspective, diagrammatic view of the heating system showing in section a portion of an outside wall enclosing the living space serviced by the sytem.
Figure 1:
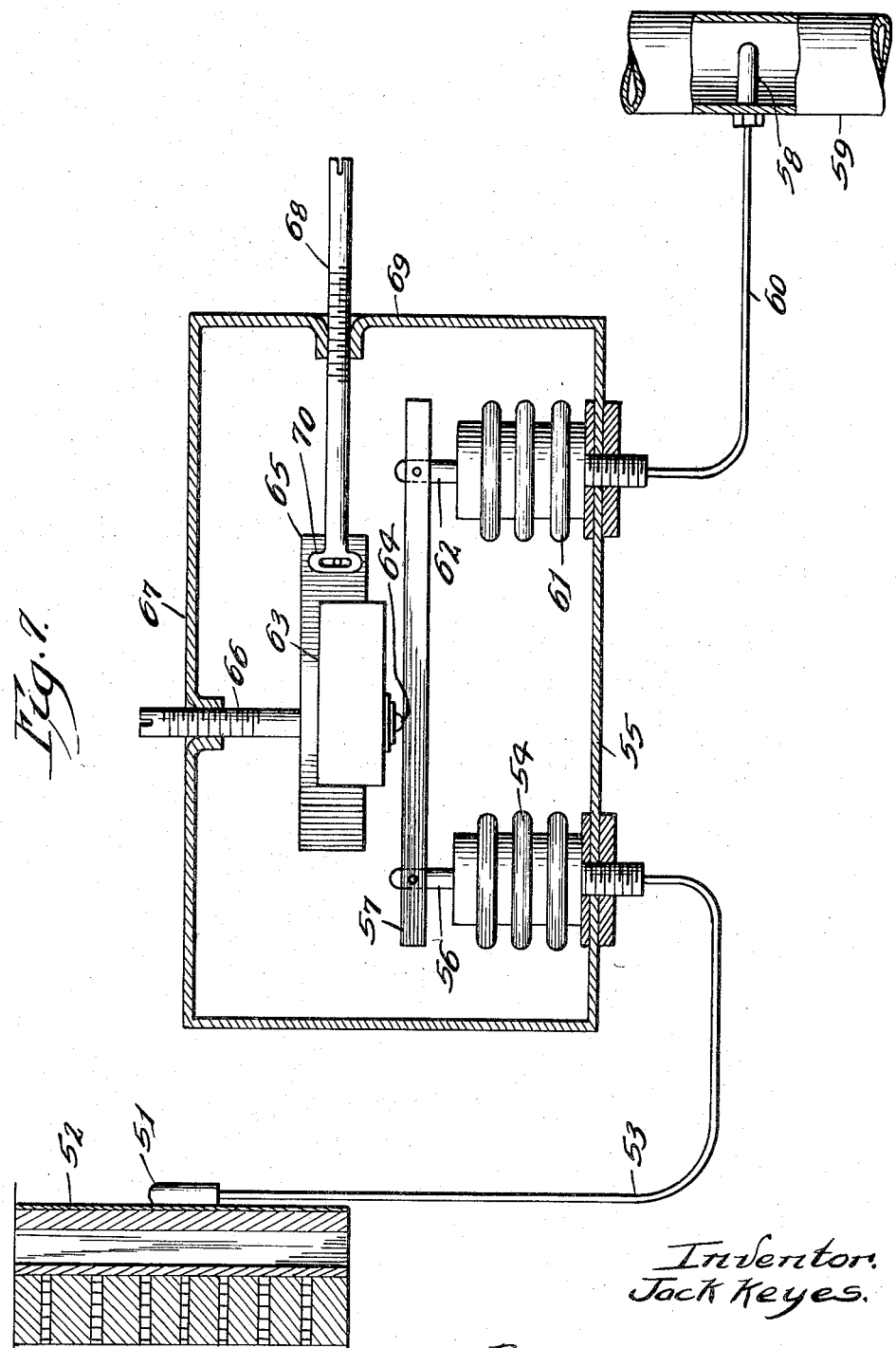

Referring to Fig. 1, the numeral 10 designates a hot water boiler from which extends a supply pipe 11 that returns to the boiler to form a closed circuit therewith and which pipe includes a circulating pump 12 driven by a motor 13. A radiator 14, representative of any desired number of such units, is connected to the pipe 11 by supply and return pipes 15 and 16, respectively, and fittings 17 which are specially designed for one-pipe systems. Fittings of this type are disclosed in United States Letters Patent No. 1,663,271, dated March 20, 1928. The radiators 14 are indicative of the elements ordinarily designated by this term in the art and also of convectors and the so-called panel heating coils which are embedded in any wall, floor or ceiling of a room.

Supply and return pipes 18 and 19, respectively, also connect a hot water heater 20 with the pipe 11 through other fittings 17 so that, when the pump 12 is operating, a supply of hot water is circulated through the heater and the rate thereof may be controlled by a valve 21 located in either the pipe 18 or the pipe 19, but which, for example, is positioned in the latter pipe.

The heater 20 is located in heat exchange relation to a control, generally designated by the numeral 22, which is suitably mounted on the interior surface of an outside wall 23 and in heat exchange relation thereto. The emission of the heater 20 is adjusted so that it bears some factorial relation to the heat input of the system proper, the factor varying with the installation.

Referring to Fig. 2, the control 22 includes a casing 24 composed of a metal having a relatively high coefficient of expansion, such as brass or copper, and which is suitably supported so that it contacts and is in heat exchange relation to the interior surface of the outside wall 23. Accordingly, the casing 24 is at all times affected by the heat transmission through this wall in either direction with accompanying variations in its length.

The lower end of the casing 24 is closed by a plug 25 that is fixed in the casing and threaded through this plug is a rod 26 composed of a non-expansible material such as Invar. The rod 26 extends upwardly through the interior of the casing 24 in coaxial and spaced relation thereto and the upper end of the rod is freely guidable in the reduced end of a sleeve holder 27 which fits within the upper end of the casing 24. Preferably, the holder 27 is composed of an insulating material and carried in the upper end thereof is a snap action switch, generally indicated by the numeral 28, and having a plunger 29 that is coaxial with the rod 26 and operably related to the upper end thereof so that movements of the rod will effect movements of the plunger and a conditioning of the switch.

The switch 28 is preferably of the type which requires only a very slight movement to shift the switching element from a first to a second position and when the actuating force is removed, the switching element automatically returns to the first position. A switch of this type is disclosed in United States Letters Patent No. 1,960,020, dated May 22, 1934, and in the arrangement shown in Fig. 2, it will be understood that the plunger 29 moves upwardly and downwardly to respectively make and break the circuit through the switch 28.

A protective shield 30, suitably attached to the wall 23, extends for at least the length of the control 22 and is adequately spaced therefrom so as to insure free circulation of air over the control. Further, and as more particularly illustrated in Fig. 2, the heater 20 is located immediately beneath the lower, open end of the shield 30 so that convection currents established by the heater 20 and the primary heating units, such as the heating radiator 14, will flow over the control 22 and so that radiant heat rays from the heater will become incident upon the control.

Associated with the foregoing elements is an electric circuit comprising power wires 31 and 32 which connect with a main switch 33 that may be manually controlled. Leading from the switch 33 and arranged to be connected with the power wire 31 is a wire 34 that connects with the pump motor 13 from which leads a wire 35 to one side of a high limit or safety control 36 that is immersed in the boiler 10. An electrically controlled heating device for the boiler is designated by the numeral 37 and it connects by wires 38 and 39 with the wires 34 and 35, respectively, so that the heating device as to its electrical portion is in parallel with the pump motor. The heating device may be a gas or oil burner or an automatic stoker. The other side of the high limit control 36 connects by a wire 40 with one pole of the switch 28 and the other pole thereof connects by a wire 41 with the switch 33 and hence with the power wire 32.

In describing the operation of the heating system shown in Fig. 1, the situation obtaining during the summer or non-heating season will first be considered. At that time, the relatively high indoor and outdoor temperature will insure such a lengthened or expanded condition of the casing 24 that the Invar rod 26 is positioned to insure an open circuit condition of the switch 28, as diagrammatically shown in Fig. 4, so that the heating device 37 and the pump motor 13 are out of operation.

As the outdoor temperature drops with the beginning of the heating season, nothing happens to the control 22 immediately because of the heat stored in the living space. As this heat is gradually lost, the interior surface of the outside wall 23 cools and, due to its heat exchange relation to the casing 24, the length of the latter begins to shorten with accompanying upward movement of the Invar rod 26 and a closing of the switch 28. The pump 12 and the heating device 37 then begin operating and heat is supplied to the space. This heat supply continues until the heat applied to the casing 24, whether due to convection air currents passing between the shield 30 and the casing or to radiant heat rays from any source, or to a combination of these heat supplies, causes a lengthening of the casing sufficient to permit an opening of the switch 28.

Therefore, during the heating season, the switch 28 opens and closes conformable to the demand of the living space for heat, but, importantly, in the operation of the system, sharp drops in the outdoor temperature do not immediately initiate a supply of heat to the space. Heat input does not begin until the outdoor temperature has so affected the control 22 by reason of its heat exchange relation to the outside wall that the switch 28 closes. In other words, the control 22 is not characterized by an anticipatory action in supplying heat to the space when the outdoor temperature drops, but delays such supply until the outdoor weather has actually lowered either or both of the comfort factors noted above. The system is accordingly more economical to operate because it inherently takes account of the heat storage capacity of the space and no heat is supplied until this stored heat has been reduced below the comfort point when the switch 28 closes.

In Fig. 5 is illustrated a variant form of the system which also employs the control 22, located as described above, but substitutes an electric heater for the water heater 20. Like parts are designated by like numerals. The numeral 42 designates a power wire which connects with one side of an electrically controlled heating device 43 for the boiler 10, which device may be an oil burner, and a wire 44 connects the device 43 with one pole of the switch 28 whose other pole connects with a power wire 45. Accordingly, the device 43 and switch 28 are series related. In parallel with the two last named elements is an electric heater 46 which is positioned in heat exchange relation to the control 22 and connects with the wires 42 and 44 by wires 47 and 48, respectively, the wire 48 including a variable resistor 49 which is adjusted so that the heat output of the heater 46 bears some factorial relation to the heat output of the system proper as determined by the operation of the heating device 43. Otherwise, the operation of this modified system is identical with that described in Figs. 1 and 2.

In Fig. 6 is illustrated a variation of Fig. 5 in which the heat source takes the form of an electrical heating grid of conventional form which would be embedded in one or more of the boundaries of the living space or otherwise placed in heat exchange relation thereto. Parts which are identical with those shown in Fig. 5 are designated by the same numerals.

The power wire 42 connects with the grid 50 that in turn leads through wire 44 with one terminal of the switch 28 whose other terminal connects with the power wire 45 (see Fig. 5). The series circuit including the heater element 46 and variable resistor 49 connects with the wires 42 and 44 in parallel relation to the grid. Accordingly, when the switch 28 is closed, the resistor 46 and grid 50 are in circuit and the operation is otherwise as described.

In Fig. 7 is diagrammatically illustrated a further modification in which the control maintains a temperature ratio between the inside surface of an outside wall and the heating medium. A temperature sensing bulb 51 is mounted on the interior surface of an outside wall 52 in heat exchange relation thereto and connects through a capillary tube 53 with a bellows 54 located within a casing 55, one end of the bellows being fast to a wall of the casing. The opposite end of the bellows 54 carries a stem 56 that is pivotally connected to one end of a walking beam 57.

A similar bulb 58 positioned within a pipe 59 through which the heating medium flows connects by a capillary tube 60 with one end of a bellows 61 also fast to the same wall of the casing 55 as the bellows 54 and the opposite end of the bellows 61 carries a stem 62 pivotally connected to the opposite end of the beam 57 relative to the connection of the stem 56 thereto. Each of the bulb-bellows systems is filled with an appropriate liquid commonly used for this purpose so that elongations and contractions of the bellows 54 and 61 effect movements of the associated ends of the beam 57, respectively.

A switch 63, having the same characteristics as the switch 28 and connected to any of the electric circuits discussed above, includes a plunger 64 operably related to an intermediate part of the beam 57 and is mounted on a carrier 65 which is vertically adjustable by means of a screw 66 threaded through the top casing wall 67 and horizontally adjustable by means of a screw threaded through an end casing wall 69. The connection of the stem 63 to the carrier 65 is of the slotted type as generally indicated by the numeral 70 and such that vertical adjustment of the carrier is possible without disturbing any given horizontal adjustment thereof.

The initial or basic setting of the Fig. 7 control is adjusted to maintain a minimum comfort condition for the occupants in the serviced space which normally would be about 70° F. in mild weather. If the control is installed during such a period, the setting remains undisturbed until the advent of cold weather when the control is adjusted by means of the screws 66 and 68 to establish a comfort condition by an appropriate change in the temperature ratio effect on the beam 57. In this adjustment, the screw 66 determines a vertical position of the switch 63 relative to the beam 57 such that the switch will close at some predetermined temperatures of the bulbs 51 and 58, while the screw 68, by adjusting the switch 63 longitudinally of the beam 57, sets the switch for operation in response to a determined ratio of movement of the bellows 54 and 61.

I claim:

1. Control means for a heating system used to heat a room having at least one wall exposed to outside temperatures and in which said heating system includes an electrical circuit adapted to be opened and closed by said control means to operate the system, said control means comprising a metal thermostatic element movable in response to temperature changes and in a direct heat-conductive relation to the inner surface of said one wall and responsive to the temperature of said surface, and a cooperating relatively fixed element coacting with said thermostatic element to open and close said electrical circuit in response to temperature changes, said control means being positioned on said one wall in close physical association with a heating element whose output is proportional to the output of the heating system when operating, whereby the temperature of the one wall effectively places the heating system in operation and the output of said closely associated heating element shuts off the heating system after it overcomes the cooling effect of said one wall on said thermostatic element.

2. Control means for a heating system used to heat a room having at least one wall exposed to outside temperatures and in which said heating system includes an electrical circuit adapted to be opened and closed by said control means to operate the system, said control means comprising a metal thermostatic element movable in response to temperature changes and in a direct heat-conductive relation to the inner surface of said one wall and responsive to the temperature of said surface, and a cooperating relatively fixed element coacting with said thermostatic element to open and close said electrical circuit in response to temperature changes, said control means being positioned on said one wall in close physical association with a heating element whose output is proportional to the output of the heating system when operating, whereby the temperature of the one wall effectively places the heating system in operation and the output of said closely associated heating element shuts off the heating system after it overcomes the cooling effect of said one wall on said thermostatic element, and means for regulating the output of said separate heater to effectively control the room temperature.

3. Control means for a heating system used to heat a room having at least one wall exposed to outside temperatures and in which said heating system includes an electrical circuit adapted to be opened and closed by said control means to operate the system, said control means comprising a thermostatic element movable in response to temperature changes and in a direct heat-conductive relation to the inner surface of said one wall and responsive to the temperature of said surface, and a cooperating element coacting with said thermostatic element to open and close said electrical circuit in response to temperature changes, said cooperating element being positioned in close physical association with a heating element whose output is proportional to the output of the heating system when operating, whereby the temperature of the one wall effectively places the heating system in operation and the output of said closely associated heating element shuts off the heating system after it overcomes the cooling effect of said one wall on said thermostatic element.

4. Control means as set forth in claim 1 in which said thermostatic element is tubular in form and said cooperating element is telescopically mounted within said tubular thermostatic element.

5. Control means as set forth in claim 1 in which shield means are provided to protect the thermostatic element from damage and to conduct convection currents from said heating element to said thermostatic element.

6. Control means as set forth in claim 3 in which said control means includes a casing having mounted thereon a pair of bellows supporting a walking beam with adjustable switch means operable in response to the position of a selected portion of said walking beam, and said thermostatic element and said cooperating element each comprises a sensing bulb, a capillary tube and a heat-expansive fluid therein with the bulbs and capillary tube being connected to the respective bellows.

7. Control means as set forth in claim 3 in which said heating element comprises an electric heater connected into said electrical circuit, and means to selectively control the output of said electric heater.

References Cited in the file of this patent

UNITED STATES PATENTS

| | | |
|---|---|---|
| 751,854 | Hoffman | Feb. 9, 1904 |
| 1,358,073 | Fulton | Nov. 9, 1920 |
| 1,883,243 | Bogle | Oct. 18, 1932 |
| 1,919,330 | Hornung | July 25, 1933 |
| 2,070,433 | Jameson | Feb. 9, 1937 |
| 2,208,272 | Heintzen | July 16, 1940 |
| 2,297,706 | Jehle | Oct. 6, 1942 |
| 2,322,872 | Moore | June 29, 1943 |
| 2,626,755 | Tidd | Jan. 27, 1953 |

FOREIGN PATENTS

| | | |
|---|---|---|
| 417,464 | Great Britain | Oct. 5, 1934 |
| 684,535 | Germany | Nov. 30, 1939 |